(12) United States Patent
Tseng et al.

(10) Patent No.: US 6,321,215 B1
(45) Date of Patent: Nov. 20, 2001

(54) EXAMINING METHOD OF LEARNING PERFORMANCE WITH COMPUTER

(75) Inventors: Bill P. J. Tseng, Taipei (TW); Fred H. Y. Chen, Hsi-An (CN); Luke B. R. Yen, Taipei (TW); Phoebe Q. J. Chen, Hsi-An (CN)

(73) Assignee: Inventec Corp, Taipei (TW)

( * ) Notice: Subject to any disclaimer, the term of this patent is extended or adjusted under 35 U.S.C. 154(b) by 0 days.

(21) Appl. No.: 09/200,404

(22) Filed: Nov. 28, 1998

(51) Int. Cl.[7] ...................................................... G06F 9/445
(52) U.S. Cl. ................................................................. 706/16
(58) Field of Search ..................................... 434/219, 350; 706/12, 16, 25; 265/65, 66

(56) References Cited

U.S. PATENT DOCUMENTS

| | | | |
|---|---|---|---|
| 6,029,043 | * 2/2000 | Ho et al. | 434/350 |
| 6,126,448 | * 10/2000 | Ho et al. | 434/219 |
| 6,160,987 | * 12/2000 | Ho et al. | 434/350 |

\* cited by examiner

*Primary Examiner*—Mark R. Powell
*Assistant Examiner*—Michael B. Holmes
(74) *Attorney, Agent, or Firm*—W. Wayne Liauh

(57) ABSTRACT

The present invention relates to an examining method of a computer-aid test for understanding the learning performance of an examinee. The examining method of the invention gives more accurate and helpful examination and learning guidance to an examinee according to the examinee's answer record of a computer aided test. In the conventional computer-aid test, the examination of a test is given according to only the ratio of the examinee's correct answers. However, the learning performance of an examinee relates to not only the ratio of the examinee's correct answers but also the sequence of the examinee's answers of testing questions. Hence, the present invention provides a new examination method to give a more suitable guidance to examinees in computer-aid tests.

10 Claims, 3 Drawing Sheets

Hsiao-Ming Wang

You have three testing objective which included:
know the answer of one question;
don't know the answer of one question;
guessed the answer of one question.

Regarding the articles, you thoroughly understand them, so there is no
need to review it again.

Verb BE, I doubt that you simply don't understand the test
and guessed the answers.

The present participle, This testing objective is your biggest
weakness and reason why you loose points in an examination.
I suggest you to take more time studying it thoroughly.

General Comments

You have an ordinary English level. As for you, hoping to
pass at the examinations will need a great effort. But don't
be discouraged, with my help, you'll surely improve.

FIG.4

EXAMINING METHOD OF LEARNING PERFORMANCE WITH COMPUTER

BACKGROUND OF THE INVENTION

1. Field of the Invention

The present invention relates to an examining method of tests with a computer, and more particularly to an artificial-intelligence (AI) examining method of tests with a computer to examine the learning performance of an examinee according to the examinee's answers of a series of arranged questions generated by the computer.

2. Description of Related Art

Computer aided tests of learning courses have been known for many years. Most of computer aided tests are used to understand the learning performance of an examinee in some learning courses, such as language learning courses. Examinations of these tests are used to give learning directions for examinees. The testing questions of a conventional computer aided test are randomly selected from a question library stored in a computer's memory. An examinee answers these question through the input unit of the computer, and the computer records and checks the examinee's answers. Then, according to the ratio of the correct answers, the computer gives a simple evaluation or suggestion to the examinee. For example, if the ratio of correct answers is sixty percent, the computer gives an evaluation like "More efforts will pursue the goal" to the examinee.

However, the learning status of an examinee cannot be exactly determined only according to the ratio of the examinee's correct answers of randomly given questions. This is because the random choice of testing questions cannot systematically analyze the examinee's learning status in learning courses. In addition, the correct-answer ratio of a test cannot clearly clarify and understand the examinee's weakness in the test. Hence, the examination of the test with the conventional computer aided examining method is not helpful to give an efficient learning guidance for an examinee.

SUMMARY OF THE INVENTION

The objective of the invention is to provide an examining method of a computer-aid test for understanding the learning performance of an examinee. The examining method of the invention gives more accurate and helpful examination and learning guidance to the examinee according to the examinee's answer record of a computer aided test.

According to the examinee's answers of the questions of a computer aided test, the computer-aid examining method of the present invention includes the following steps:

A. Build up a follow-up table of the computer aided test, which includes testing objective information, examinee's answer information and questions' sequence information;

B. List an examining report according to the follow-up table built in the step A, where the present step consists of the following steps:

b1. Build up an examining table which includes a plurality of learning performances and corresponding examining comments;

b2. According to the results of examinee's answers and the question's sequence shown in the step A, pick up a learning performance and a corresponding examining comment from the examining table as the contents of the examining report; and b3. Display the examining report.

With the help of an AI question derivation method of a computer-aid test, the examining method of the present invention can enhance its capability. In fact, the examining method of the present invention is a three-dimension examining method which is a function of three variables, which is to say, the number of testing questions, the testing objective, and the examinee's learning performance. According to these variables, the computer-aid examining method of the present invention can give examinees a more efficient learning guidance.

BRIEF DESCRIPTION OF THE DRAWINGS

Other objects, features and advantages of the invention will become apparent from the following detailed description of the preferred but non-limiting embodiments. The description is made with reference to the accompanying drawings in which:

FIG. 4 is an embodiment of the examining report of the invention.

DETAILED DESCRIPTION OF THE INVENTION

Figure 1:
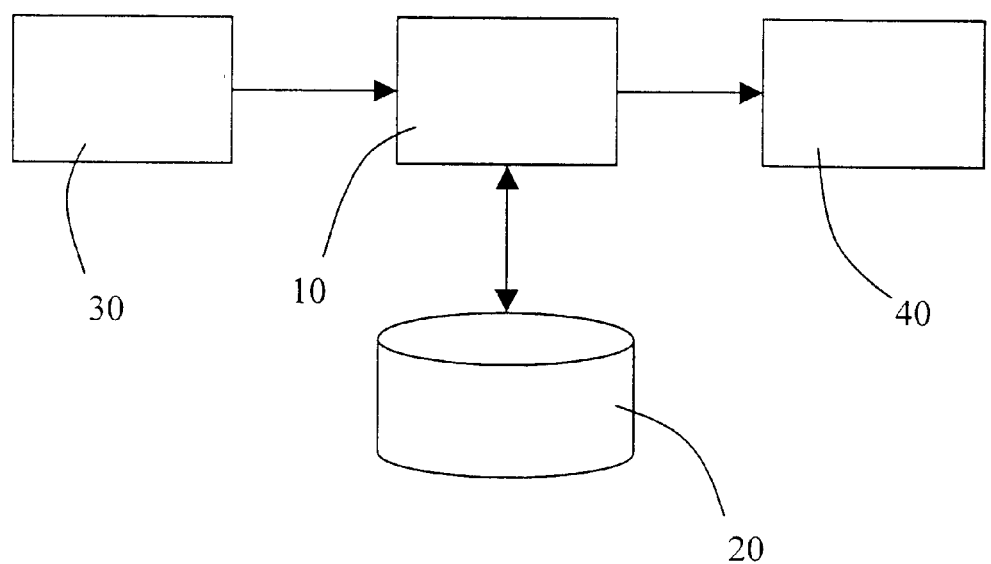
FIG. 1 is the block diagram of the hardware of an embodiment according to the present invention.

Please refer to FIG. 1, which is the block diagram of the hardware of an embodiment according to the present invention. This embodiment of an examining method of the invention includes a computer 10, a memory 20, an input unit 30 and an output unit 40.

The computer 10 is used to execute a computer-aid test program 24 to give a computer-aid test of a learning course to an examinee, record the examinee's answers in the computer-aid test, and, according to the test's results, give an examining report to the examinee.

Figure 2:
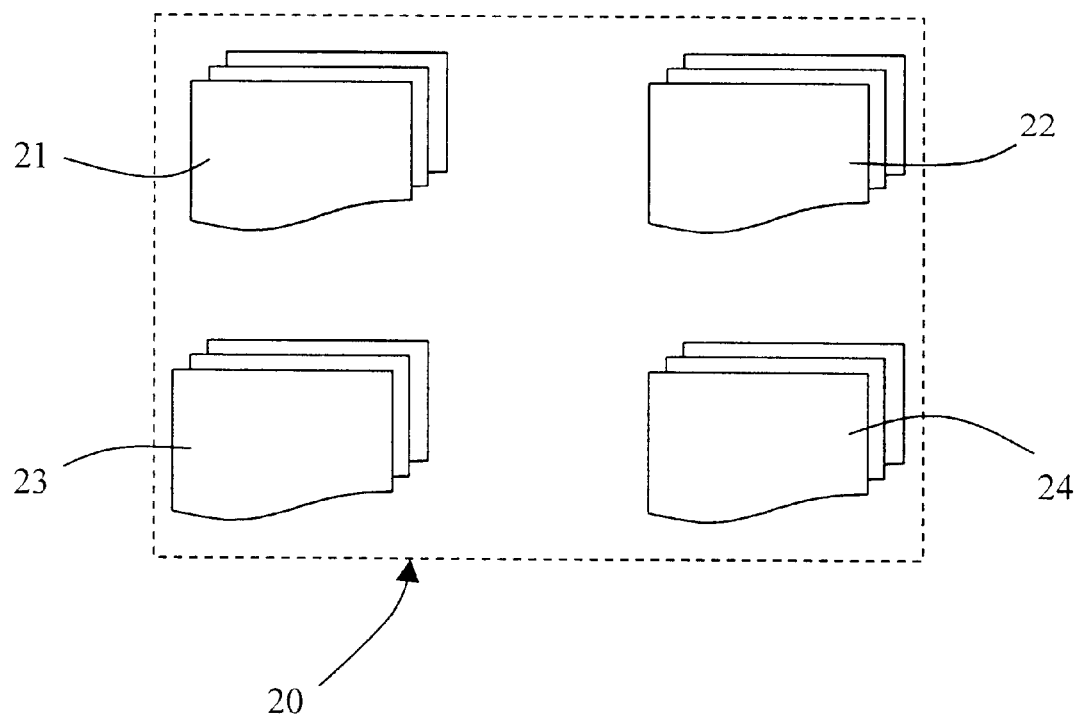
FIG. 2 is the data structure of the memory of the embodiment.

As shown in FIG. 2, the memory 20 can be a hard disk, a floppy disk, a tape or a RAM, which is used to store a question library 21, the computer-aid test program 24, a follow-up table 22 and an examining table 23. The question library 21 includes a large quantity of questions which belong to different testing objectives such as: phrase, vocabulary, article, verb conjugation of a language grammar test. For some testing objective, the computer 10 randomly chooses a plurality of questions of the testing objective from the question library 21 as the testing questions of the computer-aid test. The examining table 23 consists of different learning performances and corresponding examining comments.

The input unit 30 can be a keyboard, a mouse, a light pen or a digital board, which is used to allow the examinee to input his/her answers of the testing questions. With the input unit 30, the computer 10 records the examinee's answers and the sequence of the testing questions in the computer-aid test, which construct the follow-up table 22. The follow-up table 22 indeed exhibits the examinee's learning performance in the learning course. An example of the follow-up table 22 is shown in Table 2. The marks 'V' shown in Table 2 denote that the examinee's answer is correct, and the mark 'X' denotes the wrong answer. The first column of Table 2 records the sequence of the testing questions, and the other columns record the correct or wrong marks of the examinee's answers in different testing objectives. It is noted that the sequence of testing questions and the correction of the examinee's answers construct the examinee's learning performance. For instance, in the testing objective 1 as shown in the second column of Table 2, the examinee's learning performance is presented by "VVV" in the order of the testing questions' sequence. In addition, an example of the examining table 23 is listed in Table 1. The first column lists different learning performances, and their corresponding examining comments are listed in the second column. According to the follow-up table 22, the computer 10 picks up an examining comment, whose corresponding learning performance matches the examinee's learning performance, from the examining table 23. Integrating the examinee's answers, learning performance, and the examining comment, the examining report is constructed.

Then, the output unit 40, which the output unit can be a display or printer, displays or prints out the examining report.

Based on an intelligent question library of a question derivation method for computer-aid tests, the capability of the examining method of the present invention can be increased. In fact, the examining method with the intelligent library of the question derivation method is a three-dimension examining method which is a function of three variables, which is to say, the number of testing questions, the testing objective and the learning performance of an examinee. According to these variables, the computer-aid examining method of the present invention can give examinees more helpful learning guidance.

Figure 3:
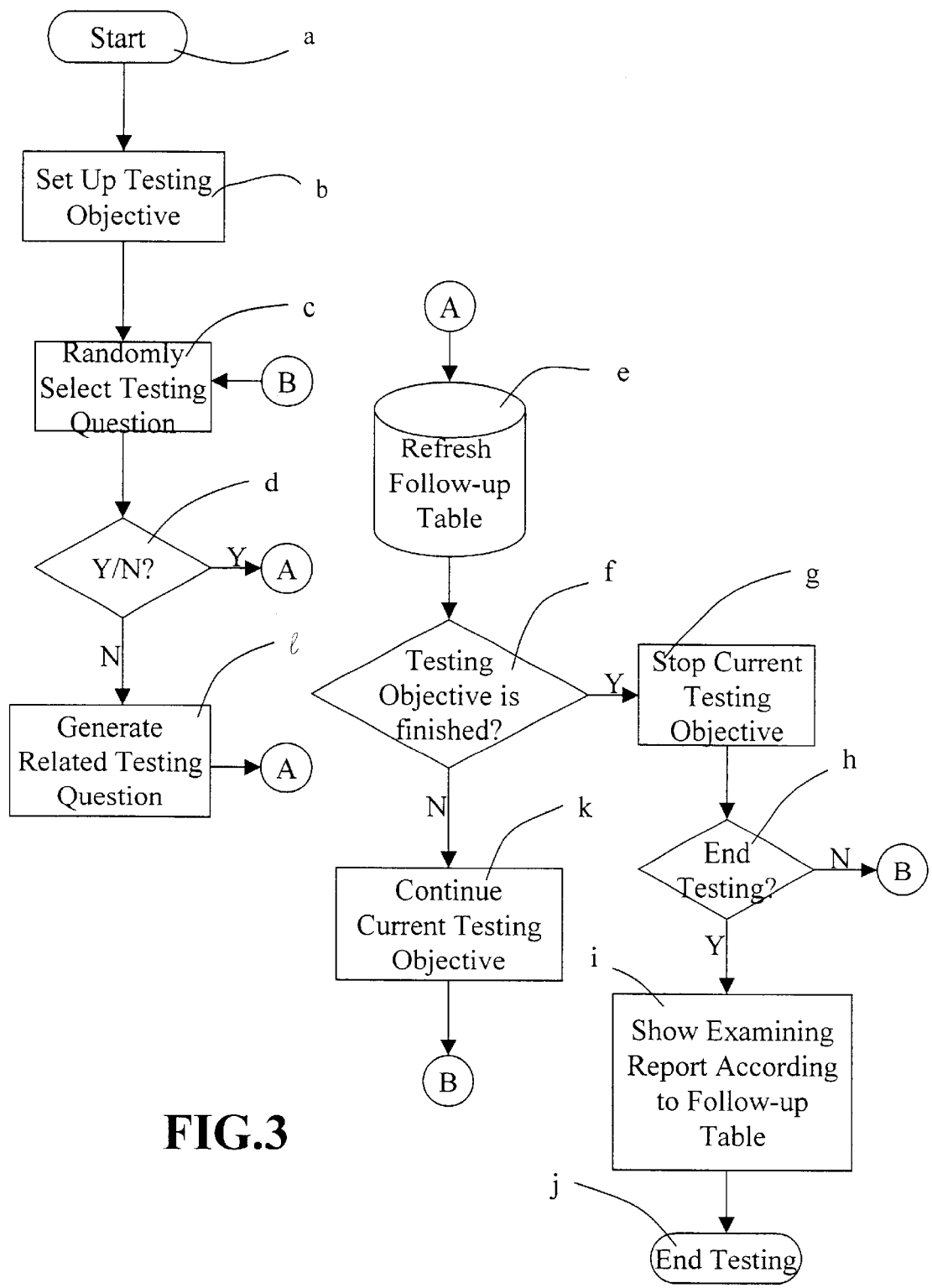
FIG. 3 is the flow chart of the examining method of the invention.

Please refer to FIG. 3, the examining method of the invention based on an intelligent question library derived by a question derivation method, which includes the following steps:

a. Start a computer-aid test by executing the computer-aid test program 24 on the computer 10;

b. Set a testing objective;

c. Randomly choose a testing question from the memory 20;

d. Check if the examinee's answer of the current testing question is correct or not; if yes, go to the next step; otherwise, go to the step 1.;

e. Refresh the follow-up table by inserting the correct mark 'V' in the union cell at the column of the current testing objective and the row of the sequence of the current question;

f. Check if the current testing question is the last testing question of the current testing objective or not; if yes, go to the next step; otherwise, go to the step k.;

g. Stop the test of the current testing objective;

h. Check if the computer-aid test is completed or not; if yes, go to the next step; otherwise, go to the step c.;

i. Construct an examining report according to the examining table and the examinee's learning performance in the follow-up table (the detailed realization of this step was shown in the step B. described above);

j. End the computer-aid test;

k. Return to the step c.; and

1. Generate a testing question relating to the examinee's answer of the current question, and return to the step e.

For example, we assume that six testing questions are enough to understand the examinee's learning performance of a testing objective in the computer-aid test. Of course, the number of testing questions can be changed in practical. The conventional examining method considers that the examinee has passed the test of a testing objective if it occurs that three consecutive examinee's answers are correct under six testing questions. Consequently, the examining report is generated and the test is ended. In other words, the assembly of the examinee's answers belongs to the following passing set in this case ('V' represents 'correct' and 'X' represents 'wrong'):

VVV,XVVV,XXVVV,VXVVV,VXXVVV,XVXVVV, VVXVVV

Similarly, the conventional examining method considers that the examinee cannot pass the test of a testing objective if it occurs that three consecutive examinee's answers are wrong under six testing questions. Consequently, the examining report is generated and the test is ended. In other words, the assembly of the examinee's answers belongs to the following failing set in this case ('V' represents 'correct' and 'X' represents 'wrong'):

XXX,VXXX,VVXXX,XVXXX,XXVXXX,VXVXXX, VVXXX

In addition, the following thirty-two assemblies are impossible to be generated in the examinee's answers, which are

XXX???, VXXX??, VVXXX?, XVXXX?, VVV???, XVVV??, XXVVV?, VXVVV?, where the mark "?" denotes that it can be one of the marks "V" and "X." The number of total assemblies of the examinee's answers of six testing questions is sixty-four for a testing objective. Hence, there are also eighteen residual assemblies of the examinee's answers constructing a confusing set. If the assembly of the examinee's answers of the six testing questions belongs to the confusing set, it means that the examinee cannot clearly understand the testing objective. In the examining method of the invention, all assemblies of the passing set and the failing set, and the confusing set are used to adjust the examinee's learning performance of the testing objective. As shown in the Table 1, the examining table 23 has fifteen examining comments and their corresponding learning performances, which are seven passing assemblies, seven failing assemblies, and a confusing class including all the confusing assemblies.

TABLE 1

Embodiment of the examining table.

| Learning Performances | Examining Comments |
|---|---|
| 1. VVV | You thoroughly understand the testing objective and there is no need to take more tests. |
| 2. XVVV | If you did not memorize the answer after the first error, there is no need to review it. |
| 3. XXVVV | You started with a wrong concept but you still got it after a great effort. Don't forget to review it once in a while! |
| 4. VXVVV | You're in a dilemma in the beginning but got the idea at the end. It's better to review it! |
| 5. VXXVVV | You had some idea in the beginning but that's not enough. The speed to correct the errors is slow but broadly speaking, the result is satisfactory. |
| 6. XVXVVV | You have light impression, cannot make your mind and are capricious. Though you got the idea at the end, don't forget to review it more often! |
| 7. VVXVVV | Basically, you're OK for you just make mistake once in a while. Practice more and you'll have no big problem! |
| 8. XXX | If you don't study hard, you'll go no way! |
| 9. VXXX | I doubt that you simply don't understand the test and guessed the answers. |
| 10. VVXXX | I just don't believe that there is such a result! You went to astray after insisting the truth . . . Take a look at your books and straight the concepts now! |
| 11. XVXXX | The truth was only a glance in the mind . . . You have to regard this testing objective as your weakness and work |

TABLE 1-continued

Embodiment of the examining table.

| Learning Performances | Examining Comments |
|---|---|
| | hard on it. |
| 12. XVVXXX | It seems that you have no confidence on yourself . . . It's better for you to regard it as your weakness. |
| 13 VXVXXX | I'm afraid that the wrong concept is already deeply rooted in your mind. Correct it now! |
| 14. XXVXXX | You can guess it right sometimes but it's still the reason why you loose points. |
| 15. confusing class | This testing objective is your biggest weakness and reason why you loose points in an examination. I suggest you to take more time studying it thoroughly. |

The examining method of the invention gives the examinee an examining comment according to not only the number of the correct examinee's answers but also the assemblies of the examinee's answers, which is to say, the number of the correct examinee's answers and the sequence of the testing questions of the testing objective.

TABLE 2 embodiment of the follow-up table.

| Question Type Sequence of Questions | 1 | 2 | 3 | 4 | 5 | 6 | ... | 99 | 100 |
|---|---|---|---|---|---|---|---|---|---|
| First Question | V | X | X | X | V | V | ... | X | X |
| Second Question | V | V | X | X | X | X | ... | V | V |
| Third Question | V | V | V | X | V | V | ... | X | X |
| Forth Question | | V | V | | X | X | ... | V | V |
| Fifth Question | | | V | | X | V | ... | V | X |
| Sixth Question | | | | | X | X | ... | V | V |

An embodiment of the follow-up table 22 is shown in Table 2. The first column records the sequence of the testing questions of a testing objective, and the other columns record the corrections of the examinee's answers of different testing objectives. The assembly of the answer marks in each column unless the first column denotes the examinee's learning performance of a testing objective. According to the examinee's learning performance of a testing objective, the examining comment of the computer-aid test is found in Table 1. Consequently, the examining report of the test is generated. FIG. 4 is an embodiment of the examining report.

TABLE 3

| Testing Objective Sequence of Questions | Article | Verb BE | Present Participle |
|---|---|---|---|
| First Question | V | V | V |
| Second Question | V | X | X |
| Third Question | V | X | X |
| Forth Question | | X | V |
| Fifth Question | | | X |
| Sixth Question | | | X |

As listed in the Table 3, an example of the test result of an examinee in an English computer-aid test is shown. Here, six testing questions are used to understand the examinee's learning performance of a testing objective. It is noted that the sequence of the testing questions of different testing objectives can be arbitrary. In the second column, the examinee's learning performance is denoted by "VVV" for the article testing objective, which is to say, the examinee's answers of three consecutive testing questions are correct. From the examining table 23 in Table 1, the examining comment of the article testing objective is "completely understood." In the third column, the examinee's learning performance is denoted by "VXXX" for the verb BE testing objective. From the examining table 23 in Table 1, the examining comment of the verb BE testing objective is "almost misunderstood." In the last column, the examinee's learning performance is denoted by "VXXVXX" for the present participle testing objective. From the examining table 23 in Table 1, since this examinee's learning performance belongs to the confusing class, the examining comment of the present participle testing objective is "to confuse this topic and need to learn it clearly." According to these examining comments of the three testing objectives, the examining report of the English computer-aid test is given in FIG. 4.

It is noted that the examining method of learning performance with computer described above are the preferred embodiments of the present invention for the purposes of illustration only, and are not intended as a definition of the limits and scope of the invention disclosed. Any modifications and variations that may be apparent to a person skilled in the art are intended to be included within the scope of the present invention.

To sum up, the computer-aid examining method of the present invention includes the following steps:

A. Build up a follow-up table of the computer aided test, which includes testing objective information, examinee's answer information, and questions' sequence information;

B. List an examining report according the follow-up table built in the step A, where the present step consists of the following steps:

b1. Build up an examining table which includes a plurality of learning performances and corresponding examining comments;

b2. According to the results of examinee's answers and the question's sequence shown in the step A, picking up a learning performance and a corresponding examining comment from the examining table as the contents of the examining report; and b3. Display the examining report.

What is claimed is:

1. An examining method of a computer-aid test with a plurality of testing questions, comprising the following steps:

a. designating a plurality of test objectives each containing a sequence of test questions;

b. obtaining answers to the test questions from an examinee;

c. constructing a follow-up table which includes at least a test objective, the sequence of test questions associated with the test objective, and the examinee's answers; and d. displaying a examining report according to the test objective, the sequence of test questions, and the examinee's answers contained in the follow-up table.

2. The examining method of the learning performance of a computer-aid test as claimed in claim 1 wherein the testing objective recorded in the follow-up table is the same as the testing objective of the testing question.

3. The examining method of the learning performance of a computer-aid test as claimed in claim 1 wherein the step b. comprises the following steps:

b1. Building up an examining table which includes a plurality of examining comments and corresponding learning performances;
b2. Picking up a learning performance and a corresponding examining comment from the examining table as the contents of the examining report according to the testing objective, the examinee's answer and the question's sequence recorded in the follow-up table shown in the step a.; and
b3. Displaying the examining report.

4. An examining method of the learning performance of a computer-aid test based on an intelligent question library derived by a question derivation method, comprising the following steps:
   a. Starting a computer-aid test based on the intelligent question library;
   b. Setting testing objective information;
   c. Randomly choosing a testing question which belongs to a testing objective from the intelligent question library;
   d. Checking if the examinee's answer of the testing question is correct or not; if yes, go to the next step; otherwise, go to the step l;
   e. Recording a testing result to a follow-up table;
   f. Checking if the testing question is the last testing question of the testing objective; if yes, go to the next step; otherwise, go to step k;
   g. Stopping the test of the testing objective;
   h. Checking if the computer-aid test is completed or not; if yes, go to the next step; otherwise, go to the step c;
   i. Constructing an examining report according to the follow-up table;
   j. Ending the computer-aid test;
   k. Randomly choosing a testing question which belongs to the testing objective from the intelligent question library and return to the step d; and
   l. Generateing a new testing question related to the examinee's answer of the testing question, and return to the step d.

5. The examining method of the learning performance of a computer-aid test based on an intelligent question library derived by a question derivation method as claimed in claim 4 wherein the testing objective belongs to the testing objective information.

6. The examining method of the learning performance of a computer-aid test based on an intelligent question library derived by a question derivation method as claimed in claim 5 wherein the testing objective information includes at least a testing objective.

7. The examining method of the learning performance of a computer-aid test based on an intelligent question library derived by a question derivation method as claimed in claim 4 wherein, in the step e, the testing result comprises an identifying mark, denoting the correction of the examinee's answer of the testing question, and the sequence information of the testing question.

8. The examining method of the learning performance of a computer-aid test based on an intelligent question library derived by a question derivation method as claimed in claim 4 wherein, in the step f, the condition identifying the ending of the testing objective is that the examinee's learning performance of the testing objective is determined.

9. The examining method of the learning performance of a computer-aid test based on an intelligent question library derived by a question derivation method as claimed in claim 4 wherein, in the step h, the condition identifying the ending of the test is that the examinee's learning performance of every testing objective which belongs to the testing objective information is determined.

10. The examining method of the learning performance of a computer-aid test based on an intelligent question library derived by a question derivation method as claimed in claim 4 wherein the step i comprises the following steps:
    i1 Building up an examining table which includes a plurality of examining comments and corresponding learning performances;
    i2 Picking up a learning performance and a corresponding examining comment from the examining table as the contents of the examining report according to the results of the follow-up table; and
    i3 Displaying the examining report.

* * * * *